Feb. 25, 1947. J. D. McKIERNAN 2,416,399
TORCH HOLDER ASSEMBLY FOR GAS CUTTING OR WELDING MACHINES
Filed Oct. 7, 1943 2 Sheets-Sheet 1
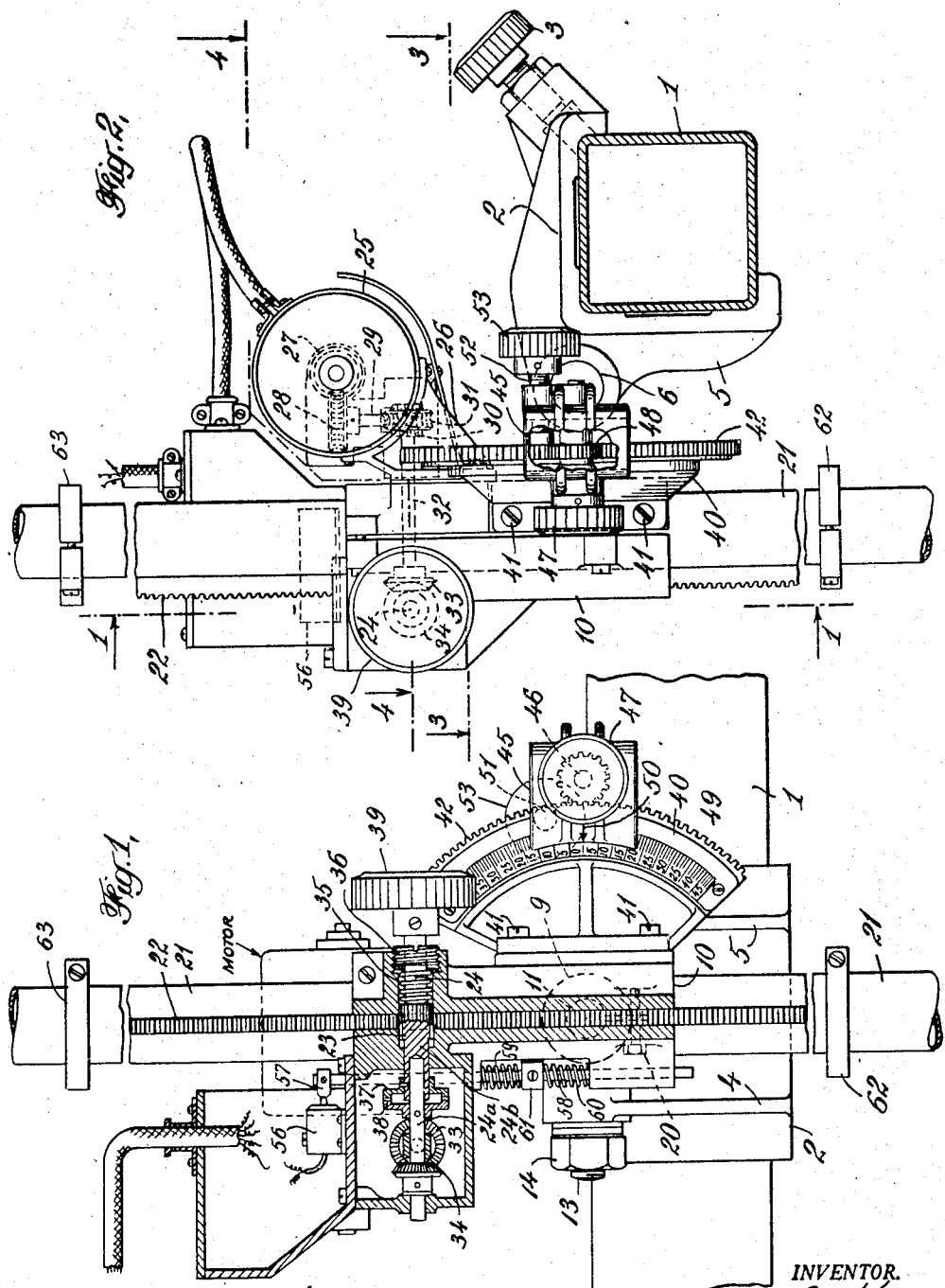

Feb. 25, 1947. J. D. McKIERNAN 2,416,399
TORCH HOLDER ASSEMBLY FOR GAS CUTTING OR WELDING MACHINES
Filed Oct. 7, 1943 2 Sheets-Sheet 2
Fig. 3,
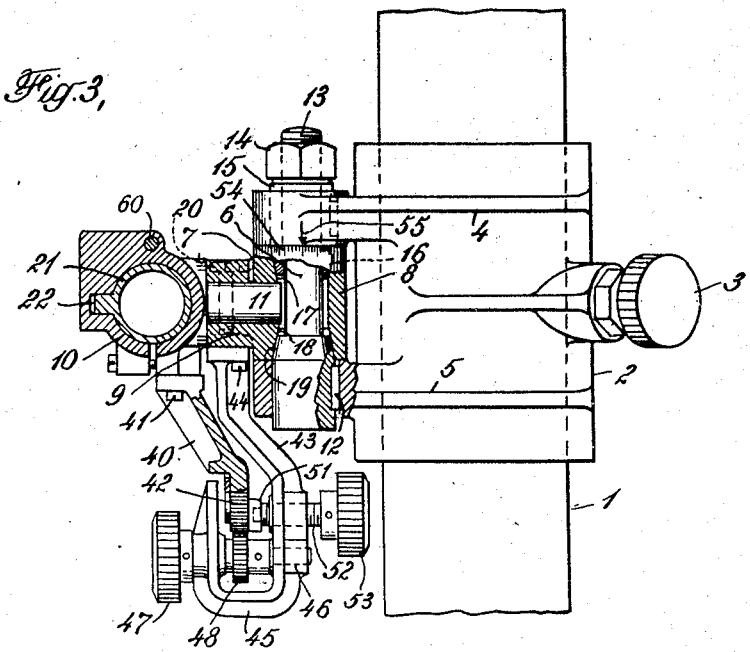
Fig. 4,
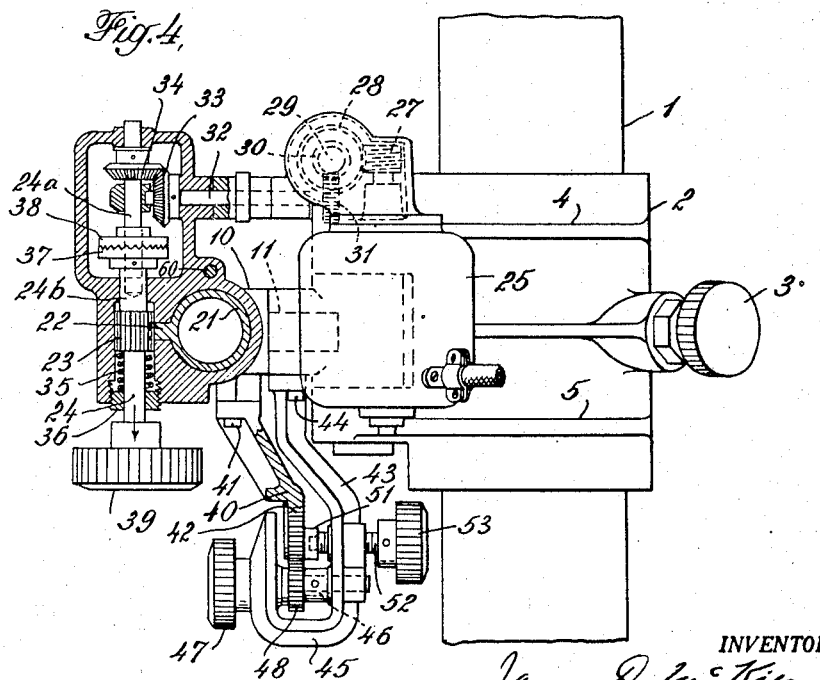
INVENTOR.
James D. McKiernan
BY
*Pennie, Davis, Marvin & Edmonds*
ATTORNEYS Patented Feb. 25, 1947

2,416,399

UNITED STATES PATENT OFFICE 2,416,399

TORCH HOLDER ASSEMBLY FOR GAS CUTTING OR WELDING MACHINES

James D. McKiernan, Brooklyn, N. Y., assignor to Air Reduction Company, Incorporated, a corporation of New York Application October 7, 1943, Serial No. 505,312

13 Claims. (266—23)

1

This invention relates to improvements in torch holders for torch machines such as cutting and welding machines having oxyacetylene or other gas torches.

The principal object of the invention is to provide a torch holder so constructed that in a multi-torch machine one or more of the torches, or all of the torches together, can be adjusted or raised and lowered in their respective holders by remote control.

Another object of the invention is to provide improved manually operable means for adjusting the torch holder to change the inclination of the torch for bevel cutting and other purposes.

According to the invention each torch-holder assembly is an independent unit and is equipped with its own power-operated means, such as an electric motor, for raising and lowering the torch in the holder, i. e., for moving it longitudinally of itself to move the torch tip toward or away from the work. In a multi-torch machine, by connecting all of the motors to a common control switch located at a convenient station, all of the torches can be moved up and down simultaneously, or any one or more of the torches can be so moved independently of the others. Each torch holder also has means whereby its own torch can be raised and lowered in the holder by hand when so desired. Adjustments of the torch holder for bevel cutting are also made by hand, manually operable means being provided in connection with each torch holder assembly for making fine adjustments of the holder about one of its supporting pivotal axes. Such manually operable means is preferably in the nature of an attachment comprising parts which are readily removable from the rest of the assembly whereby a simplified form of apparatus without such parts may be sold for use where the simpler form is sufficient.

A torch holder assembly embodying the improvements is illustrated in the accompanying drawings, in which:

Figure 1 is a front elevation of one of the assemblies, some of the parts being shown in vertical section taken on the line 1—1 of Fig. 2;

Fig. 2 is a side elevation of the assembly shown in Fig. 1 as viewed from the right;

Fig. 3 is a horizontal section taken on the line 3—3 of Fig. 2; and

Fig. 4 is a horizontal section taken on the line 4—4 of Fig. 2.

In the drawings 1 represents the torch-supporting bar of any type of torch machine with which it is desired to use the improved torch

2 holder assembly. For instance, such bar may be the torch-supporting bar of a universal cutting machine of the folding parallelogram type. A bracket 2 supports the rest of the assembly on the bar 1 and may be shifted to the desired position along the bar and then fastened in position by turning the clamping screw 3 (Figs. 2, 3 and 4). The bracket 2 has a pair of ribs 4, 5 the forward portions of which have aligned openings to receive a pin or stub-shaft 6 (best shown in Fig. 3) the axis of which is parallel to the torch-supporting bar 1. A bracket 7 has a sleeve portion 8 through which the stub-shaft 6 passes and a split sleeve 9 whose axis lies at right angles to the axis of the sleeve 8. The torch holder proper 10 has a stud 11 which is received by the split sleeve 9. Thus the bracket 7 together with the torch holder can be adjusted about the axis of the stub-shaft 6 and the torch holder can be adjusted about the axis of the stud 11. To clamp the bracket 7 and the torch holder in the desired position to which they have been adjusted on the stub-shaft 6, this shaft and the cooperating parts are preferably constructed as follows: one end of the shaft is keyed in the opening which receives it as shown at 12 in Fig. 3 so that the shaft is prevented from rotating but is capable of axial movement. The other end of the shaft 6 is threaded, as shown at 13, to receive a nut 14. The nut bears against the outer end of a bushing 15 surrounding the shaft 6. The inner end of this bushing is tapered as shown at 16 and fits into a conical seat 17 formed in one end of the bore within the sleeve 8. The other end of the bore in the sleeve 8 has a similar conical seat 18 to cooperate with a tapered portion 19 on the stub-shaft 6. Thus when the nut 14 is tightened the tapered end 16 on the bushing 15 is forced inwardly into the conical seat 17 at one end of the sleeve 8, and the tapered portion 19 on the stub-shaft is drawn into the conical seat 18 at the other end of the sleeve, thereby firmly holding the sleeve against turning until such time as the nut 14 is loosened to permit readjustment of the bracket 7 and torch holder about the axis of the stub-shaft 6.

When the torch holder has been adjusted to the desired position about the axis of its stud 11, the split sleeve 9 which receives this stud can be contracted by a bolt 20 (Figs. 1 and 3) so that it grips the stud and prevents it from turning. The split-sleeve portion 9 of the bracket 7 therefore constitutes a clamp for the stud 11 to hold the torch holder in any position to which it has been adjusted about the axis of the stud until such time as the bolt 20 is loosened to permit readjustment of the torch holder's position.

A gas torch 21, such as an oxyacetylene cutting or welding torch, is mounted in the torch holder 10 and is movable therein longitudinally of itself so that the torch tip can be moved toward or away from the work. The torch has a rack 22 along its outer side with which a pinion 23 on a shaft 24 engages. The shaft 24 is mounted to turn in the torch holder and is adapted to be rotated as hereinafter described from an electric motor 25 supported on the torch holder by means of a bracket 26 (Fig. 2).

The motor, through a worm and worm-wheel 27 and 28 (Figs. 2 and 4), drives a short vertical shaft 29, and a worm and worm-wheel 30 and 31 drives from the shaft 29 another shaft 32 extending forwardly to the shaft 24 whose pinion moves the torch in its holder. The shaft 24 is driven from the shaft 32 by means of bevel gears 33, 34.

The shaft 24 is in two sections, one designated 24a and the other 24b. The section 24b is the part of the shaft which carries the pinion 23. This section is capable of limited longitudinal movement in the torch holder and is spring pressed inwardly by a coil spring 35 (Figs. 1 and 4) reacting at its inner end against the pinion 23 and at its outer end against an adjustable nut 36. In the normal inward position of the shaft section 24b a clutch member 37 secured to its inner end engages a cooperating clutch member 38 secured to the shaft section 24a. A knob 39 is attached to the outer end of the shaft section 24b.

It will now be seen that normally the electric motor drives the pinion 23 on the shaft 24 through the clutch 37—38, but when it is desired to adjust the torch in the holder independently of the motor, the knob 39 is pulled outwardly, as indicated by the arrow in Fig. 4, and this moves the shaft section 24b axially against the tension of the spring 35 and thereby disengages the clutch members 37, 38. The knob can then be rotated while pulled outwardly to turn the pinion 23 and thereby manually adjust the torch in its holder independently of the motor. The pinion 23 is made sufficiently long in the direction of the shaft section 24b to remain in mesh with the teeth on the rack 22 even when the shaft section 24b is pulled outwardly to adjust the torch by the knob 39.

To one side of the torch holder 10 there is detachably fastened a quadrant 40 by means of the screws 41. The outer edge of the quadrant is provided with teeth 42 along an arc whose center coincides with the axis of the stud 11 which supports the torch holder in the bracket 7. An arm 43 is detachably fastened, by means of screws 44, to a flat seat on the side of the clamp 9 forming part of the bracket 7 (Figs. 3 and 4). The outer end of the arm 43 is U-shaped and curves around the outer edge of the quadrant 40 as indicated at 45. A short shaft 46 is journalled in and spans the two parallel portions of the U-shaped end of the arm 43 and is rotatable by means of a knob 47 secured to its forward end. A pinion 48 fastened to the shaft 46 between the parallel portions of the arm 43 meshes with the teeth 42 on the quadrant. Turning the knob 47 causes the pinion to actuate the quadrant and thereby swing the torch holder and the torch about the axis of the stud 11. A scale 49 on the front face of the quadrant (Fig. 1), and a pointer or other suitable marking 50 on the front face of the end of arm 43, may be provided, if desired, to indicate the angular setting of the torch obtained by the adjusting knob 47. To retain the torch holder and torch in adjusted position a friction element 51 (Fig. 4) may be made to press against the rear face of the quadrant by turning a threaded shaft 52 on the forward end of which the friction element is mounted. This shaft may be threaded into the rear portion of the U-shaped end of the arm 43 and may be turned by a knob 53 secured to its rear end.

It will be noted that when the torch holder is adjusted about the axis of the stub-shaft 6 all parts supported by the bracket 7 move as a unit and therefore the quadrant 40 and arm 43 move together, but when the torch holder is adjusted about the axis of the stud 11 by turning the knob 47, the arm 43, being supported by the portion 9 of the now rigidly held bracket 7, remains stationary and the quadrant and torch holder move with respect to it as the stud 11 turns in its supporting sleeve on the bracket 7.

If desired a scale 54 may be provided at one end of the sleeve 8 of the bracket 7 to cooperate with a pointer or other suitable marking 55 on the bracket 2 to indicate the angular setting of the torch produced by adjusting the torch holder about the axis of the stub-shaft 6.

The electric motor on the torch holder may be electrically connected to a suitable control switch (not shown) located at a convenient station. When the motor is caused to run in one direction the torch is lowered in its holder. This would be desirable, for instance, to bring the torch tip into proper relation with the work at the beginning of a cutting or welding operation. When the motor is caused to run in the opposite direction the torch is raised in its holder, this being desirable, for instance, after the cutting or welding operation has been completed. If desired a limit switch represented at 56 in Fig. 1 may be employed to stop the motor when the torch has been raised or lowered the desired amount. This switch has a bias toward open position but is held closed by a cam device 57 carried by a vertical rod 58 slidably mounted in the torch holder. The rod is yieldingly held in its neutral position by two coil springs 59 and 60 which encircle the rod and react at their adjacent ends against a block 61 secured to the rod. The other ends of the springs react against shoulders on the torch holder. The rod is displaced upwardly a short distance by a collar 62 on the torch when the torch nears the end of its upward travel and thereby moves the cam device 57 away from the limit switch and permits the limit switch to open and break the motor circuit. Likewise the rod is displaced downwardly by a collar 63 on the torch when the torch nears the end of its downward travel and similarly moves the cam device 57 away from the limit switch to break the motor circuit. The collars 62 and 63 are adjustable on the torch so that they may be properly positioned to limit the extreme travel of the torch.

In a multi-torch machine, i. e., when a number of torch assemblies are supported along the length of the bar 1, the control switch or switches for the motors may be actuated to cause all of the motors to move the torches up or down simultaneously or, since each torch holder assembly is an independent unit and each torch holder has its own individual motor, only a few out of the entire group of torches may be simultaneously moved up or down, or a single torch may be so moved by its motor. At any time the torch may be adjusted in its holder by hand independently of its motor by pulling outwardly on the knob 39 and turning it.

Adjustments of the torch to change its inclination, such as those required for bevel cutting, are made by hand by swinging the torch holder about the axis of the stub-shaft 6 and by turning the knob 47 to swing the torch holder about the axis of the stud 11 as above described. The mechanism of which the knob 47 forms a part is a desirable feature when fine adjustments of the torch about the axis of the stud 11 are desired, but nevertheless since the quadrant 40 and the arm 43 which supports the knobs 47 and 58, etc., are readily detachable from the rest of the assembly, these parts can be removed or omitted if desired and the torch holder assembly in its resulting simplified form may be sold for use where the simpler form of the apparatus will suffice.

Since the motor and all parts of the mechanism for raising and lowering the torch in its holder are mounted on the holder, the torch can be raised or lowered whenever desired regardless of the position to which the holder is adjusted about the axis of the stub-shaft 6 or the axis of the stud 11.

I claim:

1. In a torch holder assembly for gas cutting or welding machines comprising a bracket adapted to be attached to a part of the machine, a torch holder supported by the bracket and a torch mounted in said holder so as to be capable of longitudinal movement therein, the improvement which includes an electric motor carried by the torch holder, driving connections between the motor and the torch whereby the torch may be raised and lowered in the holder by the motor, a clutch in said driving connections, and means for disengaging said clutch and manually operating said driving connections whereby the torch may be raised and lowered in the holder by hand.

2. In a torch holder assembly for gas cutting or welding machines comprising a bracket adapted to be attached to a part of the machine, a torch holder supported by the bracket and a torch mounted in said holder so as to be capable of longitudinal movement therein, the improvement which includes an electric motor carried by the torch holder, driving connections between the motor and the torch whereby the torch may be raised and lowered in the holder by the motor, said driving connections including a rack on the torch and a shaft section having a pinion meshing with the rack on the torch and further including a clutch between the motor and said shaft section, and means for disengaging said clutch and turning said shaft section by hand whereby the torch may be raised and lowered in the holder manually.

3. In a torch holder assembly for gas cutting or welding machines comprising a bracket adapted to be attached to a part of the machine, a torch holder supported by the bracket and a torch mounted in said holder so as to be capable of longitudinal movement therein, the improvement which includes an electric motor carried by the torch holder, a clutch operatively connected with the motor so that it may be driven thereby, an axially movable shaft section to which the driven part of the clutch is connected, a pinion on said shaft section, a rack on the torch meshing with said pinion, and a knob on said shaft section for moving the shaft section axially to disengage said clutch and for rotating the shaft section to raise or lower the torch in the holder by hand.

4. In a torch holder assembly for gas cutting or welding machines comprising a bracket adapted to be attached to a part of the machine, a torch holder supported by the bracket and a torch mounted in said holder so as to be capable of longitudinal movement therein, the improvement which includes an electric motor carried by the torch holder, a clutch operatively connected with the motor so that it may be driven thereby, an axially movable shaft section to which the driven part of the clutch is connected, a pinion on said shaft section, a rack on the torch meshing with said pinion, a spring yieldingly urging said shaft section in a direction to engage said clutch whereby the torch may be raised and lowered in the holder by the motor, and means on said shaft section for moving it axially to disengage said clutch and for rotating the shaft section to raise or lower the torch in the holder by hand.

5. A torch holder assembly in accordance with claim 4 in which the pinion on said shaft section is elongated sufficiently to remain in mesh with the rack on the torch in all axial positions of the shaft section.

6. In a torch holder assembly for gas cutting or welding machines comprising a bracket adapted to be attached to a part of the machine, a torch holder and a torch mounted in said holder so as to be capable of longitudinal movement therein, the improvement which includes means for adjustably supporting the torch holder on said brackets so that the holder can be moved about a pivotal axis to change the inclination of the torch, an electric motor carried by the torch holder, and driving connections between the motor and the torch comprising a rack on the torch, a pinion on the torch holder meshing with said rack, and means on the torch holder for driving the pinion from the motor, whereby the torch may be raised and lowered in the holder in any position to which the torch holder is adjusted about said pivotal axis.

7. In a torch holder assembly for gas cutting or welding machines comprising a bracket adapted to be attached to a part of the machine, a torch holder and a torch mounted in said holder so as to be capable of longitudinal movement therein, the improvement which includes means for adjustably supporting the torch holder on said bracket for movement about either of two axes at right angles to each other, an electric motor carried by the torch holder, and driving connections between the motor and the torch comprising a rack on the torch, a pinion on the torch holder meshing with said rack, and means on the torch holder for driving the pinion from the motor, whereby the torch may be raised and lowered in the holder in any position to which the torch holder is adjusted about either of said axes.

8. In a torch holder assembly for gas cutting or welding machines comprising a bracket adapted to be attached to a part of the machine, a torch holder and a torch mounted in said holder so as to be capable of longitudinal movement therein, the improvement which includes a torch supporting part carried by said bracket and adapted to remain relatively fixed when the torch holder is moved as hereinafter stated, a stud and socket connection between said part and the torch holder, a quadrant fastened to the torch holder, an arm fastened to said relatively fixed part, a pinion rotatably supported by said arm, means carried by said arm for rotating the pinion, said quadrant having teeth meshing with said pinion whereby rotation of the pinion actuates the quadrant to move the torch holder about the axis of said stud and socket connection, and means carried by the torch holder and having operative connection with the torch and operable in any position to which the torch holder is adjusted about said axis for adjusting the torch longitudinally in the holder.

9. A torch holder assembly in accordance with claim 8 in which the quadrant is removably fastened to the torch holder and said arm is removably fastened to said relatively fixed part.

10. In a torch holder assembly for gas cutting or welding machines comprising a bracket adapted to be attached to a part of the machine, a stud-receiving part carried by said bracket and provided with a socket, a torch holder having a stud received by said socket so that the torch holder and stud may be moved about the axis of the stud and a torch mounted in said holder so as to be capable of longitudinal movement therein, the improvement which includes a quadrant fastened to the torch holder, an arm fastened to said stud-receiving part, a pinion rotatably supported by said arm, a knob carried by said arm for rotating the pinion, said quadrant having teeth meshing with said pinion whereby rotation of the knob and pinion actuates the quadrant to move the torch holder and its stud about the axis of the stud, and means carried by the torch holder and having operative connection with the torch and operable in any position to which the torch holder is adjusted about said axis for adjusting the torch longitudinally in the holder.

11. A torch holder assembly in accordance with claim 10 in which the quadrant is removably fastened to the torch holder and said arm is removably fastened to the stud-receiving part.

12. In a torch holder assembly for gas cutting or welding machines comprising a bracket adapted to be attached to a part of the machine, a torch holder and a torch mounted in said holder so as to be capable of longitudinal movement therein, the improvement which includes a torch supporting part carried by said bracket and adapted to remain relatively fixed when the torch holder is moved as hereinafter stated, a stud and socket connection between said part and the torch holder, a quadrant fastened to the torch holder, an arm fastened to said relatively fixed part, a pinion rotatably supported by said arm, a knob carried by said arm for rotating the pinion, said quadrant having teeth meshing with said pinion whereby rotation of the knob and pinion actuates the quadrant to move the torch holder about the axis of said stud and socket connection, means carried by said arm and adapted to be brought into engagement with the quadrant to hold it in adjusted position, and means carried by the torch holder and having operative connection with the torch and operable in any position to which the torch holder is adjusted about said axis for adjusting the torch longitudinally in the holder.

13. In a torch holder assembly for gas cutting or welding machines comprising a bracket adapted to be attached to a part of the machine, a split sleeve carried by said bracket and forming a stud-receiving portion, a torch holder having a stud received by said split sleeve so that the torch holder and the stud may be moved about the axis of the stud, means for clamping the split sleeve to the stud to retain the torch holder in the position to which it is adjusted about the axis of the stud, and a torch mounted in said holder so as to be capable of longitudinal movement therein, the improvement which includes a quadrant removably fastened to the torch holder, an arm removably fastened to said split sleeve, a pinion rotatably supported by said arm, a knob carried by said arm for rotating the pinion, means carried by said arm adapted to be brought into engagement with the quadrant to hold it in adjusted position, and means carried by the torch holder and having operative connection with the torch and operable in any position to which the torch holder is adjusted about said axis for adjusting the torch longitudinally in the holder.

JAMES D. McKIERNAN.

REFERENCES CITED

The following references are of record in the file of this patent:

UNITED STATES PATENTS

| Number | Name | Date |
|---|---|---|
| 2,200,259 | Bucknam et al. | May 14, 1940 |
| 2,323,977 | Chelborg et al. | July 13, 1943 |
| 2,055,527 | Glaum, Jr., et al. | Sept. 29, 1936 |
| 2,082,967 | McKiernan | June 8, 1937 |
| 2,183,605 | Bucknam et al. | Dec. 19, 1939 |
| 2,317,239 | Yoch | Apr. 20, 1943 |
| 1,879,346 | Lawrence | Sept. 27, 1932 |
| 465,892 | Smith | Dec. 29, 1891 |
| 1,071,539 | Weigel | Aug. 26, 1913 |
| 2,096,251 | Knight et al. | Oct. 19, 1937 |
| 2,352,140 | Trott | June 20, 1944 |
| 2,147,367 | George | Feb. 14, 1939 |